United States Patent [19]

Schaefer et al.

[11] 4,341,296
[45] Jul. 27, 1982

[54] FLOW DIVIDER FOR LIQUID COOLANT OR LUBRICANT

[75] Inventors: James R. Schaefer; Leland J. Radtke, both of North Palm Beach, Fla.

[73] Assignee: United Technologies Corporation, Hartford, Conn.

[21] Appl. No.: 189,242

[22] Filed: Sep. 22, 1980

[51] Int. Cl.³ ............................................. F16D 13/74
[52] U.S. Cl. .................................. 192/113 B; 308/122
[58] Field of Search ........... 192/113 B, 113 A, 113 R, 192/18 A; 74/605; 184/72, 5, 612; 308/122, 123, 240

[56] References Cited

U.S. PATENT DOCUMENTS

| | | | |
|---|---|---|---|
| 2,054,377 | 9/1936 | Havill et al. | 192/113 B |
| 2,298,645 | 10/1942 | Jackes | 192/113 B |
| 2,632,544 | 3/1953 | Hockert | 192/113 B |
| 2,775,331 | 12/1956 | Peterson | 192/113 B |
| 2,922,314 | 1/1960 | Johnson et al. | 192/18 A |
| 3,202,253 | 8/1965 | Merritt et al. | 192/113 B |
| 3,841,455 | 10/1974 | Eastwood | 192/113 B |

*Primary Examiner*—George H. Krizmanich
*Attorney, Agent, or Firm*—Robert C. Walker

[57] ABSTRACT

The present invention provides apparatus for precisely distributing a liquid coolant or lubricant about the interior of a rotary machine. Distribution in known quantity is sought over a wide range of shaft speeds.

In one embodiment the apparatus of the invention is employed to distribute oil in various quantities to bearings and splines within a clutch assembly. Lubricating oil is sprayed from a stationary nozzle into the interior of a rotating shaft. An insert at the interior of the shaft has a plurality of longitudinal splits which intercept and collect the oil in proximity to orifices in communication with bearings and splines to which oil distribution is desired.

3 Claims, 3 Drawing Figures

FLOW DIVIDER FOR LIQUID COOLANT OR LUBRICANT

TECHNICAL FIELD

This invention relates to rotary machinery and more specifically to an apparatus for distributing a liquid coolant and/or lubricant thereabout.

The concepts were developed in the gas turbine industry for use in clutch applications, but have very wide applicability within and without that industry, particularly where positive distribution of a liquid in metered amounts is required.

BACKGROUND ART

Rotary machines and particularly high speed machines such as those in use in industry today have spawned complex cooling and lubricating problems. Solutions thereto are required to prevent mechanical deterioration of the relatively rotating components. The clutch assembly discussed herein is representative of such machines. Numerous bearings supporting shafts of the machinery require active lubrication to prevent the excessive buildup of heat energy in the bearings. Additionally splines at points of shaft connection require lubrication to protect against tooth wear.

Traditional lubricating systems have injected oil to the interior of a rotating shaft. Centrifugal forces acting upon such oil are relied upon to urge the oil outwardly against the interior wall of the shaft and ultimately to orifices disposed therein for distribution to the bearings and splines. In applications requiring assured flow in metered amounts to respective bearings and splines, such distribution systems alone have not proved entirely successful.

Scientists and engineers in the industry, therefore, seek improved systems capable of reliable distribution in simple yet effective manners.

DISCLOSURE OF INVENTION

According to the present invention lubrication and cooling oil is distributed to orifices at the interior of a rotating shaft by a cylindrical insert having longitudinal slits therein for dividing and collecting sprayed oil in proximity to the orifices.

The primary element of the present invention is the flow divider. The flow divider is formed of a cylindrical insert having a plurality of longitudinally extending slits. An oil supply nozzle is capable of spraying oil into the interior of the insert. The slits intercept and trap oil sprayed by the nozzle in equal amounts as the slits are rotated past the nozzle. Oil collected in each slit is flowed through a corresponding orifice in the rotor shaft. Each orifice is of sufficient size to flow the entire amount of oil intercepted by the corresponding slit.

A principal advantage of the present invention is effective distribution of oil. Oil is divided equally among the grooves such that equal amounts of oil are flowable through each orifice. The equal distribution of oil is unaffected by rotor speed. The distribution apparatus itself is mechanically uncomplicated yet highly effective and reliable. Accurate control of oil flow is achievable. Systems requiring a greater flow of oil are serviced by two or more orifices. The split in oil flow is proportional to the number of servicing orifices.

The foregoing, and other features and advantages of the present invention will become more apparent in the light of the following description and accompanying drawing.

BEST MODE FOR CARRYING OUT THE INVENTION

Figure 1:
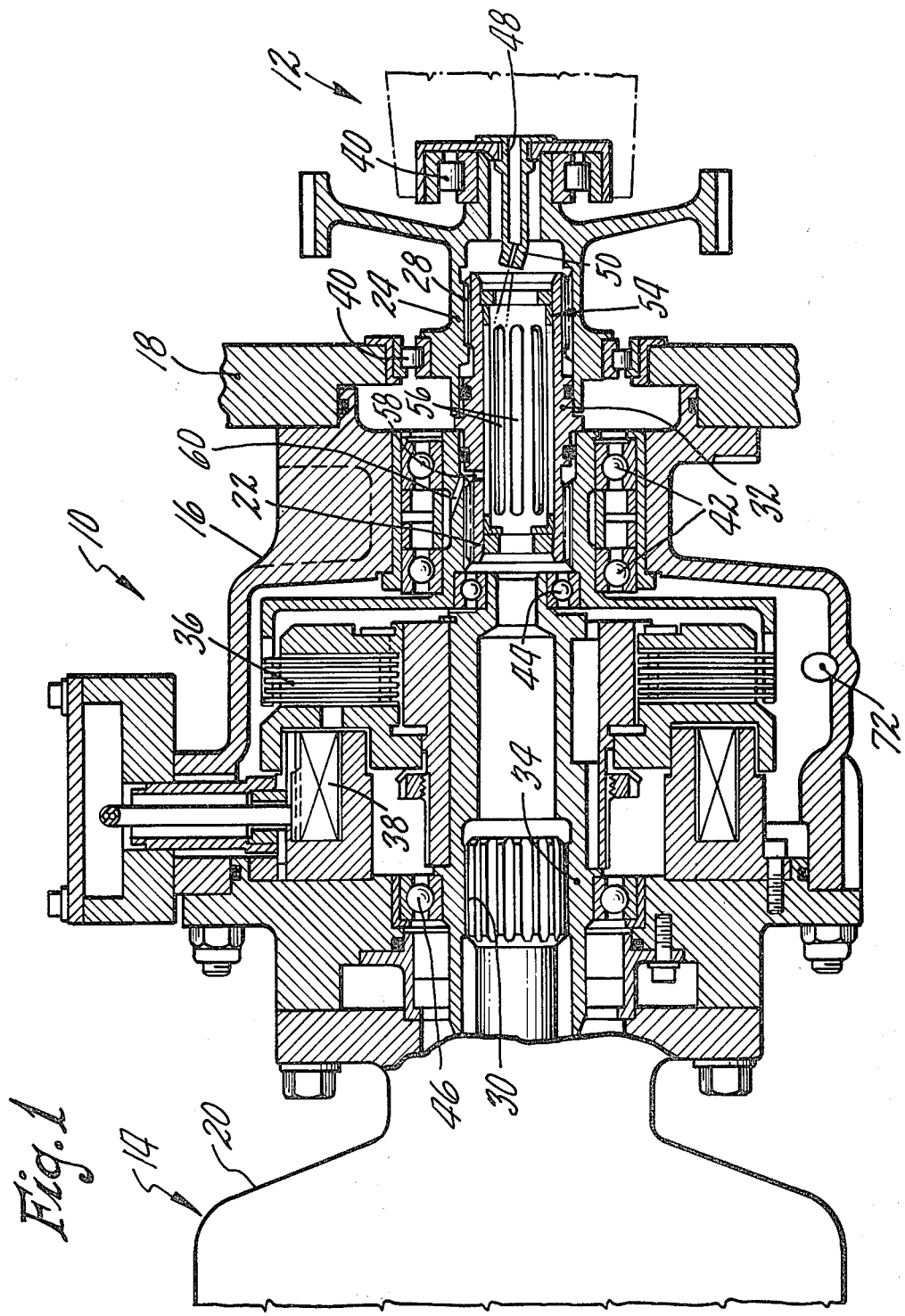
FIG. 1 is a simplified cross section view of coupling apparatus incorporating the flow divider of the present invention.

A shaft clutch 10 employing the flow dividing concepts of the present invention is illustrated in the simplified FIG. 1 view. The clutch is illustrated between a gearbox 12 and a pump 14. A housing 16 of the clutch is joined at one end to a gearbox housing 18 and at the other end to a pump housing 20. A driven shaft 22 of the clutch joins a driving shaft 24 of the gearbox to a pump shaft 26 of the pump. The driving shaft is joined to the driven shaft at an input spline 28. The driven shaft is joined to the pump shaft at an output spline 30.

The driven shaft is formed of two principal components: a clutch input shaft 32 and a clutch output shaft 34. The input shaft is joined to the output shaft at a set of clutch plates 36. The clutch is of the electromagnetic type which is actuatable by energizing the magnet 38.

The driving shaft 24 of the gearbox 12 is supported by a set of drive gear support bearings 40. The clutch input shaft 32 of the driven shaft 22 is supported by a set of input shaft support bearings 42. The clutch output shaft 34 of the driven shaft is supported by an intershaft bearing 44 and an output shaft support bearing 46. Support of the pump shaft 26 is not illustrated.

Figure 2:
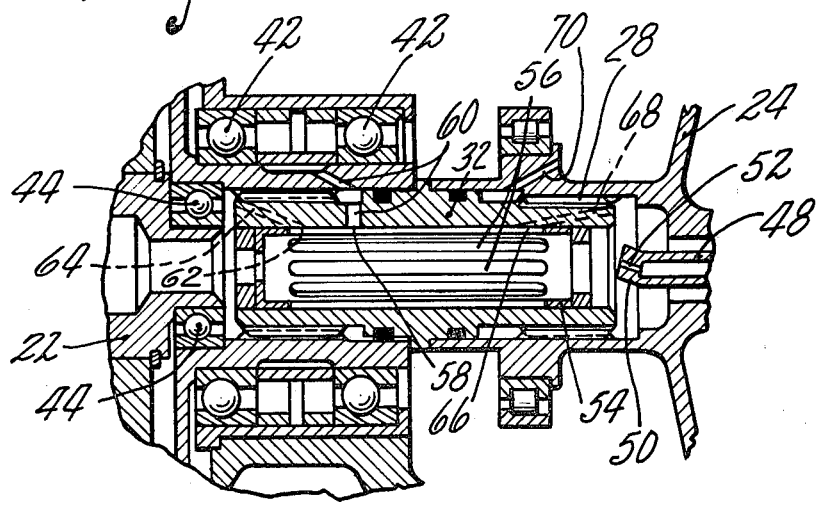
FIG. 2 is an enlarged view of a portion of the FIG. 1 cross section view showing flow divider.

Means for providing a continuous and precise supply of oil to various splines and bearings of the clutch is illustrated in FIG. 1 and in greater detail in FIG. 2. An oil supply line 48 is capable of supplying oil under pressure to a stationary nozzle 50 at the gearbox. The nozzle has an internal discharge passageway 52 which is canted so as to spray oil against the interior of the clutch input shaft 32. A cylindrical insert 54 having a plurality of longitudinal slits 56 is disposed at the interior of the shaft 32 and is rotatable therewith. One or more orifices, such as the orifice 58 illustrated, open to contiguous passageways 60 leading from the interior of the shaft 32 to the input shaft support bearings 42. One or more orifices, such as the orifice 62 illustrated, open to contiguous passageways 64 leading from the interior of the shaft 32 to the intershaft bearing 44. One or more orifices, such as the orifice 66 illustrated, open to contiguous passageways 68 leading from the interior of the shaft to the input spline 28. Each of the orifices 58, 62 and 66 is in circumferential alignment with one of the longitudinal slits 56 of the cylindrical insert 54. A spline oil drain passage 70 is provided. A bearing oil drain orifice 72 is provided in the clutch housing.

Figure 3:
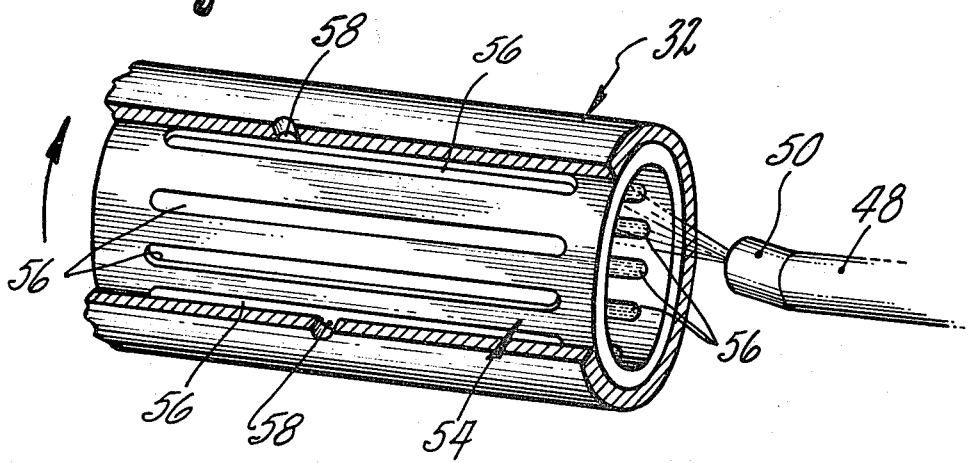
FIG. 3 is a simplified partial perspective view illustrating the flow dividing concepts.

The oil flow dividing and collecting capability of the present invention is illustrated in the FIG. 3 view of the flow divider. The flow divider is formed of the cylindrical insert 54 and the longitudinal slits 56 disposed therein. In the operating mode oil is sprayed from the passageway 52 of the stationary nozzle. Sprayed oil is intercepted by the slits 56 of the insert 54 as the slits are rotated past the nozzle spray. Intercepted oil is collected in the slits and flowed to orifices at the interior of the shaft 32. Each orifice is of sufficient diameter to accept all of the oil intercepted by the corresponding slit. Resultantly, the flow of oil is equally divided among the longitudinal slits and subsequently flowed in equal amounts through the orifices.

In the event that one system serviced requires a greater amount of oil than another system, one or more orifices and contiguous passages associated therewith are provided to that system. Within the clutch application illustrated six (6) slits and corresponding orifices are provided. Three (3) slits and orifices lead to the input shaft support bearings 42; two (2) slits and orifices lead to the intershaft bearing 44; and one (1) slit and orifice leads to the input spline 28. The amount of oil flow to the three systems is in proportion to the number of slits and orifices provided thereto.

Although the invention has been shown and described with respect to detailed embodiments thereof, it should be understood by those skilled in the art that various changes and omissions in form and detail may be made therein without departing from the spirit and the scope of the invention.

We claim:

1. Apparatus for distributing a liquid to orifices about the interior of a rotating shaft, which comprises:
    a cylindrical insert disposed at the interior of the shaft and rotatable therewith wherein the insert is open at one end and has a plurality of longitudinally extending slits therethrough, one each in alignment with a corresponding orifice to which distribution of the liquid is desired; and
    a stationary nozzle at one end of the insert which is capable of spraying said liquid into the interior of the insert through said open end for collection in the slits of the insert and subsequent distribution to the corresponding orifices.

2. The invention according to claim 1 wherein said nozzle has a passageway through which the liquid is flowable and wherein said passageway is canted to direct the liquid toward said slits as said slits are rotated past the eminating spray.

3. The invention according to claim 2 wherein said apparatus is incorporated with a clutch assembly for dividing and distributing lubricating oil to bearings and splines of the clutch assembly.

* * * * *